United States Patent

[11] 3,598,901

| | | | |
|---|---|---|---|
| [72] | Inventor | William E. Glenn, Jr. Stamford, Conn. | |
| [21] | Appl No | 876,653 | |
| [22] | Filed | Nov. 14, 1969 | |
| [45] | Patented | Aug. 10, 1971 | |
| [73] | Assignee | Columbia Broadcasting System, Inc. New York, N.Y. | |

[54] OPTICAL GRATINGS RECORDING SYSTEM
20 Claims, 6 Drawing Figs.

[52] U.S. Cl. ............................................. 178/5.4 BD, 178/6.6 TP
[51] Int. Cl. ............................................. H04n 9/12, H04n 5/82
[50] Field of Search ............................................. 178/6.6 A, 5.4, 5.4 CR, 5.4 BD

[56] References Cited
UNITED STATES PATENTS

| 2,985,866 | 5/1961 | Norton | 178/5.4 CR |
| 3,078,338 | 2/1963 | Glenn | 178/5.4 BD |

*Primary Examiner*—Richard Murray
*Attorney*—Brumbaugh, Graves, Donohue & Raymond ABSTRACT: A recording medium is scanned by an electron beam. As the beam scans the medium its motion is modulated to produce a series of high-intensity dots along the lines of the scan. The beam is caused to oscillate to produce an optical grating pattern of variable orientation and intensity by smearing the dots. A second optical grating pattern of fixed orientation can be recorded simultaneously. This system can be used to record color images. The grating of fixed orientation represents one primary color and the grating of variable orientation represents the remaining two primary colors.

PATENTED AUG 10 1971

INVENTOR.
WILLIAM E. GLENN, JR.
BY Brumbaugh, Graves,
Donohue + Raymond
his ATTORNEYS

OPTICAL GRATINGS RECORDING SYSTEM

BACKGROUND OF THE INVENTION

The present invention relates to an improved system for recording optical gratings, and more particularly to a novel and highly effective system for recording optical gratings representing three primary colors present in a color image.

My U.S. Pat. No. 3,291,903 issued Dec. 13, 1966 and my U.S. Pat. No. 3,270,613 issued Sept. 6, 1966 disclose a system in which optical gratings are recorded on thermoplastic film. These gratings represent the three primary colors of a color optical system. When the film is used in a projector of the type disclosed there, the gratings separate the light from the projector into components representing the three primary colors and a color image is produced. The present invention comprises a greatly improved system of this general type.

In the system disclosed by my patents cited above the gratings are orthogonally oriented. This enables one of the three colors to be separated from the other two by its directional orientation. However, the other two colors must be represented by gratings having the same orientation which are superimposed upon each other. Because of the necessity for separating the light diffracted by the two superimposed gratings, resolution in that direction must be sacrificed by a factor of five as compared to the film resolution. This system is superior to earlier systems in which all three primary colors are represented by superimposed gratings having the same orientation. Resolution in such systems must be sacrificed in a ratio of 10 to 1.

As can be seen from the above, directional orientation is superior from a resolution standpoint, and it would be advantageous if all three primary colors could be separated in this way. The patent to Bocca et al. U.S. Pat. No. 2,189,751, issued Feb. 13,1940 discloses a system in which all three primary colors are distinguished by directional orientation. In this system resolution is sacrificed by a ratio of only 2 to 1. However, because there are three colors and only two orthogonal directions in a plane, there are cross products in mixture colors. These colors therefore tend to desaturate. Because of the properties of the eye, this desaturation is particularly objectionable in the case of yellow.

SUMMARY OF THE INVENTION

In the case of the present invention, directional orientation is utilized to separate all three primary colors and the above-mentioned disadvantage of the system disclosed by Bocca et al. is overcome. This is accomplished by utilizing a grating of fixed orientation and a simultaneously recorded grating continuously variable orientation. The grating of variable orientation represents the first and second primary colors. The sum of the intensities of these two colors is represented by the intensity or depth of this grating. The proportional representation of each color is indicated by the orientation of the grating. The third primary color is represented by the grating of fixed directional orientation.

In the apparatus and method disclosed here, the gratings are recorded on thermoplastic film by using an electron beam. This radiant energy beam is of constant intensity and scans the thermoplastic film producing a series of parallel lines in the conventional manner. The beam is controlled and modulated by circuits responsive to electrical inputs representing the three primary colors into which color images are broken down. As the beam scans across the film horizontally it is caused to oscillate or wobble in the vertical direction at a high frequency. As the amplitude of this oscillation is increased the line scanned on the film becomes less intense because the effect of the electron beam is distributed over a larger area. The input signal representing one primary color is used to modulate the amplitude of this oscillation. Thus, when the color represented is weak the oscillation has a comparatively high amplitude and the line scanned, which forms part of the grating of fixed orientation, is resolved to a lesser extent.

To simultaneously form the grating of variable orientation the speed of the horizontal scan of the beam across the film is caused to be nonuniform so as to produce a series of high-intensity dots along the lines of the scan. The intensity of the dots is modulated in accordance with the sum of the intensities of the two primary colors not represented by the fixed horizontal grating described above. Because of the above-mentioned vertical oscillation, the dots on the horizontal lines are smeared to form vertical lines. When these lines are precisely vertical they indicate an equal mixture of the two colors represented by the variable-orientation grating. In order to vary the angle between this grating and the lines of the scan to represent different mixtures of the two colors, an additional horizontal oscillation of the same frequency as the vertical oscillation is imposed upon the electron beam. The amplitude of this oscillation is proportional to the difference between the intensities of the two colors. The horizontal and vertical oscillations are in phase and combine to produce a single oscillation of the beam which forms a continuously variable angle with the lines of the scan.

The horizontal oscillation can, of course, shift its phase by 180° and still be in phase with the vertical oscillation. Thus, there are two possible relationships between the horizontal and vertical components of the oscillation depending upon the sign of the difference between the two colors. In other words, the lines produced by the smearing of the dots deviates from the vertical in either direction depending upon which of the two colors represented predominates. The amount of deviation depends upon the proportional strengths of the colors.

An apparatus for recording information according to the invention comprises a means of projecting a beam of radiant energy onto a record medium and a means for causing the beam to scan the record medium. A means is provided for causing the beam to oscillate as it scans and another means is provided for continuously varying the angle between the oscillation and the lines of the scan. In this way the optical grating pattern of continuously variable orientation is produced. This grating may represent two primary colors. An additional grating of fixed orientation may be simultaneously recorded to represent the third primary color.

For a more detailed understanding of the invention, reference may be made to the drawings and description below in which specific embodiments of the instant inventive concept are disclosed.

DESCRIPTION OF THE PREFERRED EMBODIMENTS

In the embodiments described here the diffraction of variable orientation corresponds to first and second primary colors red and green. The third primary color, blue, is represented by the grating of fixed orientation. It should be noted at the outset that the gratings used can be any type of optical gratings whether the principle of diffraction or the principle of refraction is involved. In this embodiment the gratings are formed by third dimensional distortions on the surface of a record medium comprising thermoplastic film. This has been found to yield the highest quality image.

It should also be noted that any three colors two of which cannot be added to form the third can be used as the primary colors. Additionally the colors represented by the various gratings and orientations can be interchanged.

Figure 4:
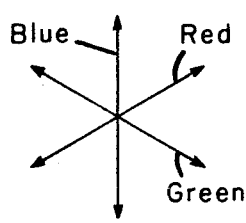
FIG. 4 is a diagram showing the directions in which the primary colors are diffracted in accordance with the preferred embodiments.

The directions in which the light representing the three primary colors is diffracted in accordance with these embodiments is shown in FIG. 4. The angles between the various adjacent colors are each 60°. Under some circumstances it may be desirable to alter these angles to favor the directional separation between red and green.

Figure 5:
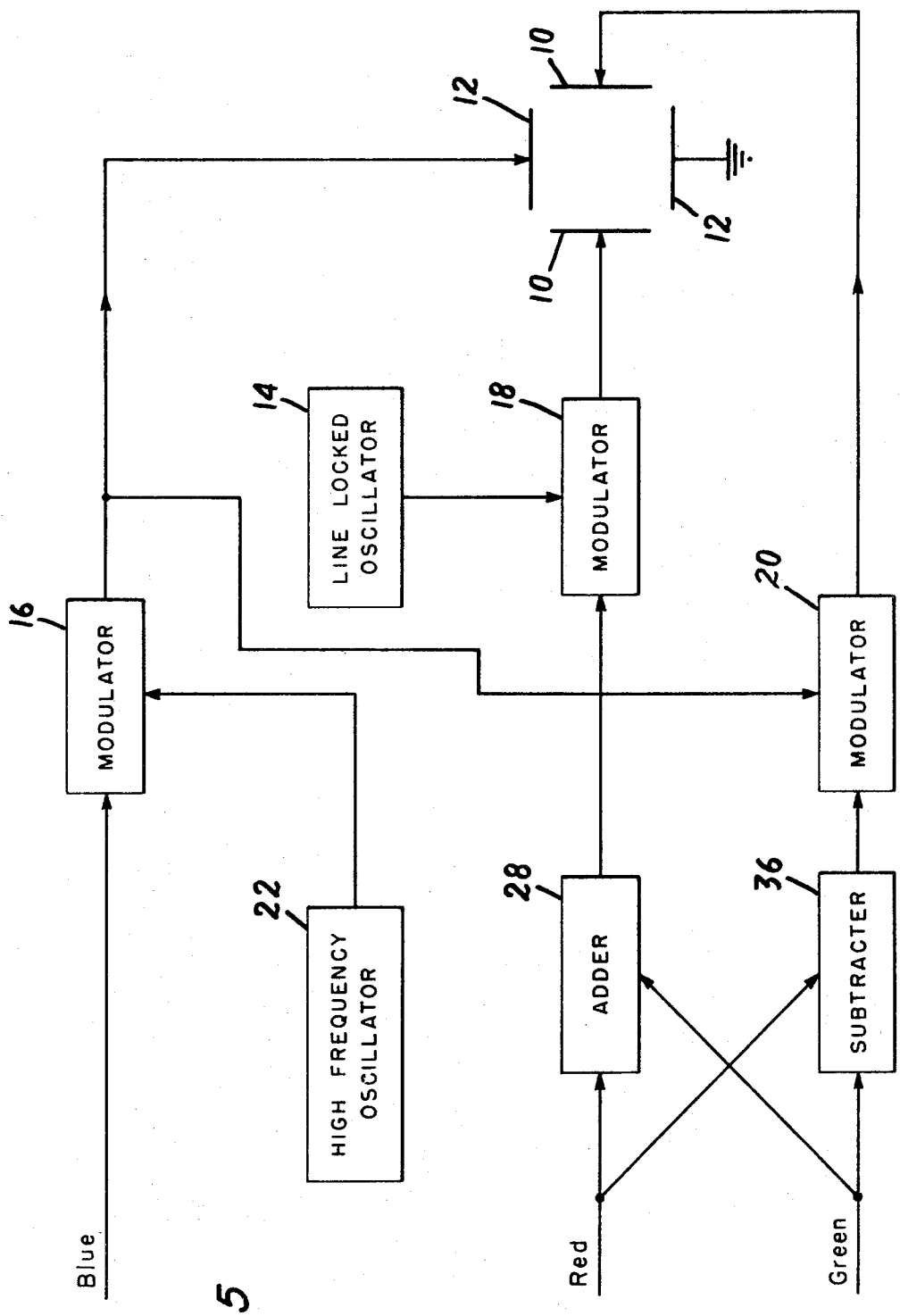
FIG. 5 is a block diagram of a first representative circuit used to control a radiant energy beam in accordance with the invention.

FIG. 5 is a block diagram of a first embodiment of a circuit for controlling an electron beam in accordance with the invention. The beam is of uniform intensity and passes between horizontal deflection plates 10 and vertical deflection plates 12. A line-locked oscillator 14 functions as a means for causing the beam to scan the film. A scanning rate of 525 lines per frame, for example, is appropriate but the rate may be selected from a wide range. While passing over the film this beam deposits a static charge. The film is later processed to cause the surface to become distorted in accordance with the deposited charge.

The scanning motion of the beam is modified by three modulators 16, 18 and 20 so that a charge pattern is produced that corresponds to the desired color image.

A means for controlling the intensity of the grating of fixed orientation representing the color blue comprises the modulator 16 which modulates the amplitude of the high frequency oscillation imposed on the vertical deflection plates 12. This oscillation is produced by a means for causing the beam to oscillate as it scans comprising a high frequency oscillator 22. An oscillation of 45 megahertz, for example, is appropriate although a wide range of frequencies may be used. The amplitude of these oscillations is inversely proportional to the input signal representing the color blue. Thus, when the color blue is absent the amplitude of the oscillations is great and the effect of the beam traversing the film horizontally is distributed over a relatively large area because of the vertical oscillations of high amplitude, thereby causing the horizontal lines to be unresolved. Conversely, when a high intensity of the color blue is present, vertical oscillations are of lower amplitude and the charge imparted to the film by the horizontally moving beam is concentrated on a smaller area, thus producing a grating of higher resolution and intensity. In this way a grating composed of horizontal distortions of the film surface which varies in intensity in accordance with the presence of the color blue is produced.

Figure 1:
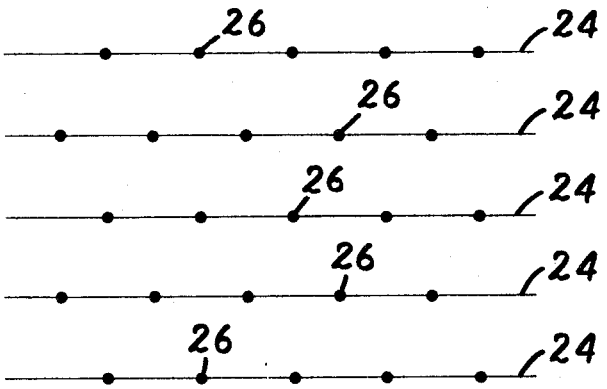
FIGS. 1, 2 and 3 show, very schematically, examples of patterns produced on a record medium in accordance with the invention.

Another grating pattern which represents the other primary colors, red and green, is superimposed upon the first grating representing the color blue. This grating pattern is produced by smearing a series of high-intensity dots located along the horizontal lines of the blue grating referred to above. These dots are shown schematically in FIG. 1. The horizontal lines of the blue grating are represented by the lines 24. The high-intensity dots are designated 26. The dots on each successive line of the scan are formed halfway between the horizontal positions of the dots 26 on the preceding line. This phase reversal is accomplished by the action of the modulator 18 on the oscillator 14. A dot spacing of 0.866 times the line spacing is appropriate although not required by the invention.

As stated above the electron beam is of constant intensity. The high-intensity dots are produced by varying the horizontal rate of travel of the beam. A slow movement of the beam corresponds to an area of high intensity. The horizontal travel of the beam is controlled by the line-locked oscillator 14. The rate of travel is varied by the modulator 18. Modulators such as this which produce a nonuniform scanning motion are well known in the art and have been used in the past to superimpose a plurality of gratings along the lines of the scan. For this reason, such a device is not described in detail here.

The modulator 18 is responsive to the output of an adder means 28 whereby the intensity of the dots is controlled. This adder produces a signal which varies in proportion to the sum of the intensities of the red and green inputs. The dots 26 are smeared by the same high frequency oscillation or wobble, produced by the oscillator 22, which is used to control the intensity of the color blue. This vertical oscillation or wobble causes the dots 26 in FIG. 1, to be smeared so as to produce a second grating directly proportional in intensity to the combined intensities of red and green represented by the output of the adder 28 and having a directional orientation different from that of the grating representing blue.

Figure 2:
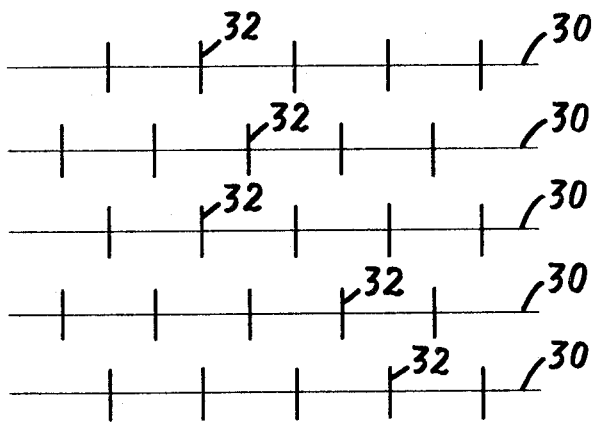
Figure 3:
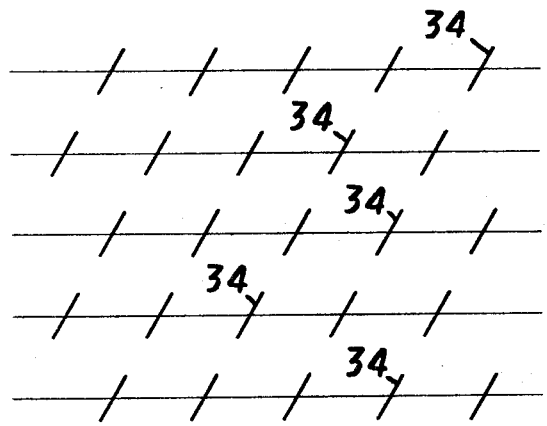

The oscillation or wobble produced by the oscillator 22, as modulated by the modulator 16, is, as mentioned above, vertical in direction and normal to the lines of the grating representing blue. This orientation is shown in FIG. 2 in which the lines 30 correspond to the lines 24 in FIG. 1 and represent the horizontal blue grating. The lines 32 are produced by smearing the high-intensity dots 26 of FIG. 1 in the vertical direction. This vertical orientation is chosen to represent an even mixture of the colors red and green. The grating can be tipped towards the horizontal as in the recording illustrated in FIG. 3. Here the lines produced by smearing the dots are represented by lines 34 and have been tipped in the clockwise direction so as to represent the color green. They can similarly be tipped in a counterclockwise direction so as to represent a greater proportion of the color red.

The angle of the lines 32 or 34 produced by smearing the high-intensity dots is controlled by the output of the modulator 20. The input to the modulator 20 is taken from the output of the high frequency oscillator 22 after it has been modulated by the modulator 16 in accordance with the intensity of blue. The modulation produced by the modulator 20 is determined by the output of a subtractor means 36 which subtracts the green signal from the red signal. Thus, the output of modulator 20 has an amplitude of oscillation which varies with the difference between red and green and with the coincident intensity of blue. The subtractor 36 and the modulator 22 together form a means for continuously varying the angle between the oscillation and the lines of the scan.

Because the horizontal wobble or oscillation is derived from the same source as the vertical oscillation, the two are in phase, i.e., the peak of a horizontal oscillation coincides with the peak of a vertical oscillation. Therefore, the motion produced by the resulting combined oscillations traces a series of lines at an angle to the horizontal lines of the scan and the blue grating. Because the vertical oscillation as well as the horizontal oscillation is modulated according to the intensity of blue, the angle of the lines is determined solely by the difference between the intensities of red and green represented by the output of the subtractor 36.

The subtractor 36 preserves the sign of the difference between red and green. This is used by the modulator 20 to determine the phase of the high frequency horizontal oscillation in accordance with the predominant color. Thus, to create a counterclockwise tilt representing red the left hand extreme of the horizontal oscillation corresponds timewise to the top of the vertical oscillation. To produce green, the right hand extreme of the horizontal oscillation corresponds timewise to the top of the vertical oscillation.

Utilizing this circuitry an electron beam of uniform intensity can be controlled so as to produce a superimposition of two gratings containing all of the desired information pertaining to three colors. The horizontal grating of fixed orientation, representing blue here, varies in intensity with that color. The grating of continuously variable orientation varies in intensity with the combined intensities of red and green, and in its directional orientation, so as to reflect the proportional representation of these two colors. The three primary colors, here red, green and blue, can thus be combined so as to produce any desired hue and saturation.

It is apparent that the length of the line producing the red-green grating varies with the value of blue which is simultaneously recorded. If blue is relatively intense the high frequency oscillation will be of relatively small amplitude. Thus, the high-intensity dots will be smeared into short lines of relatively high intensity. If blue is relatively weak the oscillations will be of relatively high amplitude and the dots will be smeared into longer lines of corresponding lower intensity. While this effect is present, it does not produce objectionable variations in the resulting image.

The above-described embodiment produces a system of optical gratings containing the desired luminance and chrominance information which is superior to that produced using previously known methods and devices. However, the effectiveness of the grating produced does vary to some extent, although to a lesser extent than when prior art devices are used, depending upon the color represented by the red-green grating. It can be seen from an examination of FIG. 1 that dots arranged according to that pattern will produce a better grating when the lines into which the dots are smeared assume one of three positions. When the color yellow is transmitted the lines are vertical and dots on alternated horizontal lines line up in the vertical direction. If red or green is to be produced then any given dot will produce a line directed toward one of the two nearest dots on the adjacent line and a similarly effective grating will be produced. The least effective gratings are produced for colors lying between red and yellow or between green and yellow.

An embodiment which overcomes the undesirable effect described above is shown schematically in FIG. 6. In this embodiment the dots of each successive line are placed so that they line up with the dots of the preceding line at the angle of the grating, thus always producing a grating of maximum effectiveness.

Figure 6:
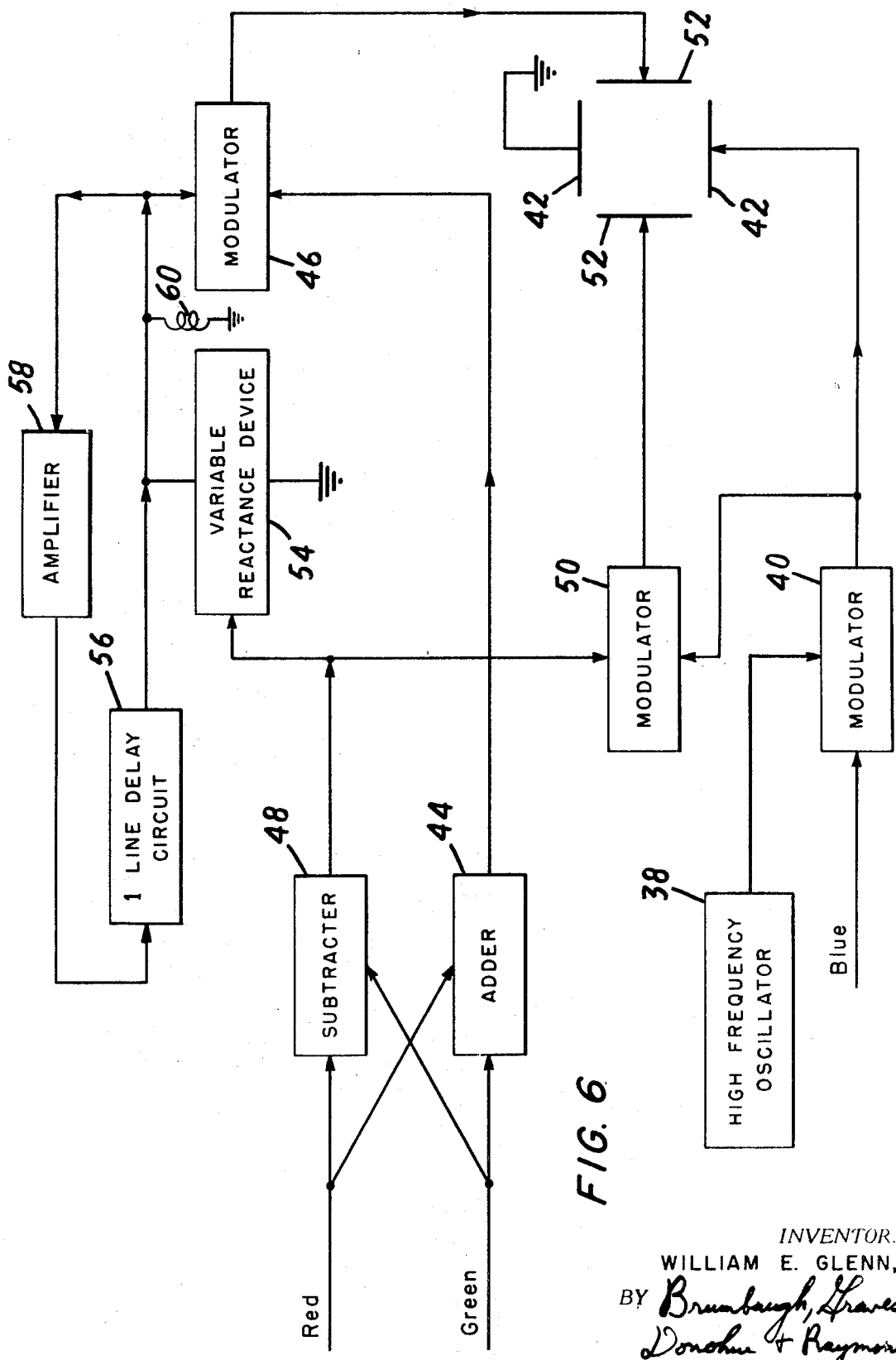
FIG. 6 is a block diagram of another representative circuit constructed in accordance with the invention.

The device of FIG. 6 operates in a manner generally similar to the device of FIG. 5. A high frequency oscillator 38 produces an output which is fed through a modulator 40 which is in turn responsive to the input representing the color blue. Thus, the output of modulator 40 produces a potential difference between vertical deflection plates 42 which has the frequency of the oscillator 38 and varies in amplitude with the reciprocal of the intensity of the color blue.

The signals representing the colors red and green are applied to an adder 44. The output of this adder forms an input to the modulator 46, thus modulating the intensity of the high-intensity dots in accordance with the sum of the inputs of these two colors. The intensities of the red and green inputs are subtracted by a subtractor 48 and the sign of the difference is preserved. The output of the subtracter provides an input to a modulator 50, thus producing an oscillation on horizontal deflection plates 52. This oscillation causes the grating produced from the dots to be tilted. In these foregoing respects the device is similar to that described above with respect to FIG. 5.

A variable-reactance device 54 and a one-line-delay circuit 56 are additional components of the embodiment shown in FIG. 6. These components form a means for causing the high-intensity dots to be oriented so that dots on successive horizontal lines scanned on the film fall along each of the successive lines forming the red-green grating pattern of variable orientation. The input to the variable reactance device 54 is supplied by the subtracter 48. As explained above the output of this subtracter corresponds to the angle of the grating to be produced. Thus, the signal representing the spacing of the dots is delayed by one line by the circuit 56 and then returned as an input to the variable reactance device to form the signal for the next line after being phase modulated by a tuned circuit in accordance with the output of subtracter 48. An amplifier 58 maintains the amplitude of the dots. The line connecting the variable reactance device 54 to the modulator 46 is grounded through a radio frequency choke 60.

Systems of the above type are, of course, more easily designed where the scan is not interlaced.

The embodiments described above are merely exemplary implementations of the basic concept disclosed. It will occur to those skilled in the art that the invention can be modified in numerous ways with the objective of producing the disclosed system of gratings. It is also noted that the optical gratings need not represent colors but could be used to represent any plurality of variables which vary throughout a plane. Therefore, the invention is not deemed to be limited except as defined by the appended claims.

I claim:

1. An apparatus for recording information comprising means for projecting a beam of radiant energy onto a record medium, means for causing the beam to scan the record medium, means for causing the beam to oscillate as it scans and means for continuously varying the angle between the oscillation and the lines of the scan, whereby an optical grating pattern of continuously variable orientation is produced.

2. The apparatus of claim 1 wherein said means for varying the angle of the oscillation comprises a subtracter responsive to the difference between first and second input variables.

3. An apparatus for recording information on a record medium comprising means for projecting a radiant energy beam onto the record medium, means for causing the beam to scan the record medium, means for producing high-intensity dots along the lines of the scan, means for causing the beam to oscillate at an angle to the lines of the scan whereby said high-intensity dots are smeared to produce an optical grating pattern of continuously variable orientation.

4. The apparatus of claim 3 wherein said means for projecting a radiant energy beam is an electron gun arranged to project a stream of electrons onto said record medium, said record medium comprising thermoplastic film.

5. The apparatus of claim 3 for recording a color image further comprising a subtractor means for controlling the angle of said oscillation responsive to the difference between first and second input variables representing two primary colors whereby the orientation of said pattern is controlled.

6. The apparatus of claim 5 further comprising an adder means responsive to the sum of said first and second input variables, the output of said adder means being supplied to said means for producing high-intensity dots whereby the intensity of said pattern is controlled.

7. The apparatus of claim 6 further comprising a means for further controlling said oscillation responsive to a third input variable representing a third primary color whereby the intensity of the lines of the scan is varied to produce an additional optical grating pattern of fixed orientation superimposed on said pattern of variable orientation.

8. An apparatus for recording color images comprising means for projecting a radiant energy beam onto a record medium, means for causing said beam to scan the record medium, means for producing high-intensity dots along the lines of the scan, means for causing the beam to oscillate as it scans the record medium, first means for controlling said oscillation whereby the high-intensity dots are smeared to produce an optical grating pattern of variable orientation representing first and second primary colors, and second means for controlling said oscillation whereby an additional optical grating pattern of fixed orientation representing a third primary color is superimposed on said optical grating of variable orientation.

9. The apparatus of claim 8 wherein said first means for controlling said oscillation comprises an adder responsive to the sum of two input variables representing said first and second primary colors and a subtractor responsive to the difference between said first and second primary colors.

10. The apparatus of claim 9 wherein said second means for controlling said oscillation comprises a modulator responsive to an input variable representing said third primary color.

11. The apparatus of claim 10 further comprising a means for causing the high-intensity dots to be oriented so that dots on successive lines scanned on the film fall along each of the successive lines forming the grating pattern of variable orientation.

12. A method of recording two continuously variable values comprising recording an optical grating on a record medium, varying the intensity of said grating in accordance with the sum of said two values, and continuously varying the angle of said grating in accordance with the difference between said two values.

13. The method of claim 12 in which said values represent primary colors of a color image.

14. A method of recording color images comprising breaking down the image to be recorded into three input variables representing primary colors, causing an optical grating to be recorded on a record medium, varying the intensity of said grating in accordance with the intensity of one of said primary colors, causing a second optical grating to be simultaneously recorded on said recording medium at an orientation different from the orientation of said first optical grating, varying the intensity of said second optical grating in accordance with the sum of the intensities of the remaining two primary colors and varying the orientation of said second optical grating in accordance with the difference between the intensities of said remaining two primary colors.

15. A recording of the changing values of two variables comprising a record medium with an optical grating recorded thereon, the directional orientation of said optical grating varying continuously with the relative intensities of said two variables.

16. A recording of a color image comprising a record medium and an optical grating recorded on said medium, the orientation of said grating varying continuously in accordance with the difference between the intensities of two primary colors present in the image and the intensity of said grating varying in accordance with the sum of the intensities of the two primary colors.

17. The recording of claim 16 in which said record medium is thermoplastic film.

18. An apparatus for recording color images on a record medium comprising means for projecting a radiant energy beam onto the record medium, means for causing the beam to scan the record medium, means for producing high-intensity dots along the lines of the scan, means for causing the beam to oscillate at an angle to the lines of the scan whereby said high-intensity dots are smeared to produce an optical grating pattern which can be processed to produce at least one optical grating, the directional characteristics of the grating pattern providing for the directional separation of information relating to at least two colors represented by the grating pattern.

19. The apparatus of claim 18 wherein said means for producing high-intensity dots is arranged to vary the intensity of said dots to record additional information relating to the two colors.

20. An apparatus for recording information on a record medium comprising means for projecting a radiant energy beam onto the record medium, means for causing the beam to scan the record medium, means for producing high-intensity dots along the lines of the scan, means for causing the beam to oscillate at an angle to the lines of the scan whereby said high-intensity dots are smeared to produce optical grating patterns having amplitude and orientation determining the color to be reproduced.